(12) United States Patent
Harada et al.

(10) Patent No.: US 8,506,037 B2
(45) Date of Patent: Aug. 13, 2013

(54) IMAGE FORMING APPARATUS

(75) Inventors: Yoshikazu Harada, Nara (JP); Norio Tomita, Nara (JP); Tetsushi Ito, Nara (JP); Showtaro Okamoto, Nara (JP); Tetsuya Yamaguchi, Nara (JP); Yoshiteru Kikuchi, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1658 days.

(21) Appl. No.: 11/946,544

(22) Filed: Nov. 28, 2007

(65) Prior Publication Data

US 2008/0123139 A1 May 29, 2008

(30) Foreign Application Priority Data

Nov. 29, 2006 (JP) ................................ 2006-322135

(51) Int. Cl.
*B41J 29/393* (2006.01)
(52) U.S. Cl.
USPC .................................... 347/19; 347/9; 399/49
(58) Field of Classification Search
USPC ...................... 347/5, 9, 19; 399/49
See application file for complete search history.

(56) References Cited

U.S. PATENT DOCUMENTS

2006/0233561 A1* 10/2006 Yamaoka ..................... 399/49

FOREIGN PATENT DOCUMENTS

| JP | 64-6981 A | 1/1989 |
|---|---|---|
| JP | 2001-209270 A | 8/2001 |
| JP | 2004-109876 A | 4/2004 |
| JP | 2005-4121 A | 1/2005 |
| JP | 2005-99716 A | 4/2005 |
| JP | 2006-171352 A | 6/2006 |
| JP | 2006-256127 A | 9/2006 |
| JP | 2006-293240 A | 10/2006 |

* cited by examiner

*Primary Examiner* — Lam S Nguyen
(74) *Attorney, Agent, or Firm* — Birch, Stewart, Kolasch & Birch, LLP

(57) ABSTRACT

An image forming apparatus including: an output image forming section for forming an image and a pattern on a supporting medium under a prescribed condition; an output section for transferring the formed image on a recording sheet; a correction section for performing reading of the formed pattern and correcting the condition based on a result of the reading; and a correction control section for controlling operations of the output image forming section, the output section, and the correction section, wherein the correction control section identifies whether or not an area where the image is to be formed and an area where the pattern is to be formed overlap each other, and when the areas are identified that they do not overlap each other, the correction control section controls the output image forming section to simultaneously form the image and the pattern in parallel on the supporting medium.

11 Claims, 8 Drawing Sheets

PRINT QUEUE (BEFORE CHANGE)

Fig.5A

| PAGE SIZE | NUMBER OF PAGES | ... | DATA REFERENCE DESTINATION |
|---|---|---|---|
| B4 | 1 | ... | 0x30005822 |
| A4 | 100 | ... | 0x30052455 |
| B4 | 3 | ... | 0x30047522 |

PRINT QUEUE (BEFORE CHANGE)

Fig.5B

| PAGE SIZE | NUMBER OF PAGES | ... | DATA REFERENCE DESTINATION |
|---|---|---|---|
| B4 | 3 | ... | 0x30047522 |
| B4 | 1 | ... | 0x30005822 |
| A4 | 100 | ... | 0x30052455 |

WHEN NUMBER OF PAGES INCREASES UNTIL JOB 3 IS EXECUTED AND EXCEEDS UPPER LIMIT OF CORRECITON TIMING, JOB ORDER IS CHANGED TO PRIOTIZE AND EXECUTE JOB OF 3 PAGES OF B4 SIZE.

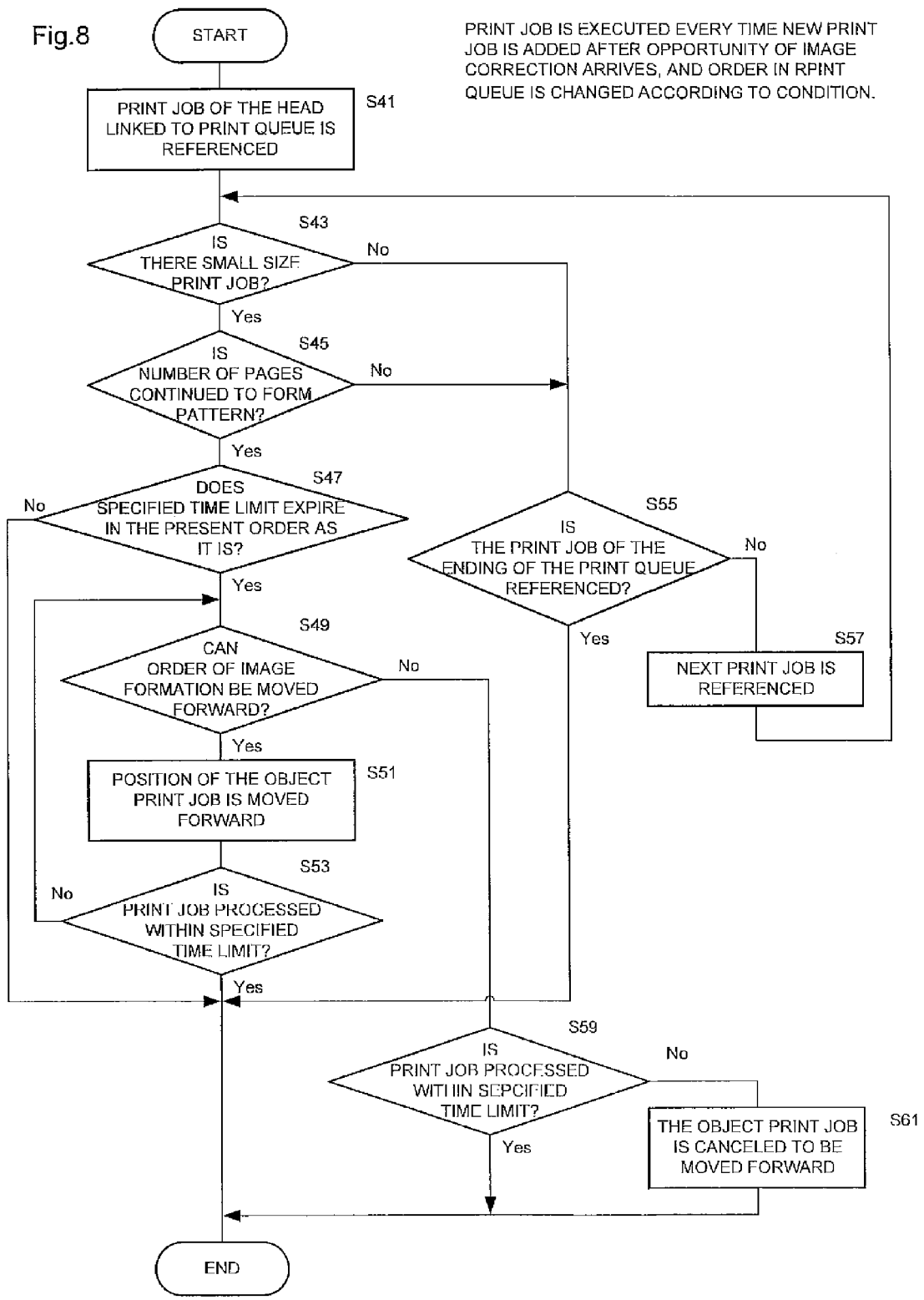

IMAGE FORMING APPARATUS

CROSS-REFERENCE TO RELATED APPLICATION

This application is related to Japanese application No. 2006-322135 filed on Nov. 29, 2006 whose priority is claimed under 35 USC §119, the disclosure of which is incorporated by reference in its entirety.

BACKGROUND OF THE INVENTION

1. Field of the Invention

The present invention relates to an image forming apparatus that forms a pattern on a supporting medium and performs correction of an image quality by using the pattern.

2. Description of the Related Art

The image forming apparatus that forms a pattern on a supporting medium and performs correction of an image quality by reading a formed pattern is known. A color image forming apparatus forms an image of a plurality of color components at each prescribed forming position, and outputs each image in a state of being superposed on a recording sheet. At this time, when a position forming the image of each color component is deviated, this is regarded as a color misregistration by a user. The color misregistration is included in the image quality. Therefore, in order to make the color misregistration unobtrusive, an image forming position of each color component is corrected by forming a color misregistration pattern and reading its position. Alternatively, in order to correct a change in density of each color component with time, there is an image forming apparatus that prepares a density pattern, reads and corrects the density of the formed pattern. The density of each color component is included in the image quality. Also, there is an image forming apparatus that forms a position, where the color misregistration pattern is formed, at opposite end portions in a width direction, when a direction orthogonal to a transfer direction of the recording sheet is set as the width direction (e.g., see Japanese Unexamined Patent Application No. 2004-109876).

In order to maintain an excellent image, an interval of correction is preferably set shorter. However, a considerable processing time is required for forming and detecting the pattern. Therefore, an opportunity of performing correction is set not to obstruct an image formation (print), being an original function of an apparatus, as much as possible.

The timing of the correction is, for example, performed in many cases just before starting page(s) of print (print job) or just after ending the print job. This is because a total processing time is shortened by interposing a preparation step before image formation and a subsequent step after image formation, between pattern formation and an image formation to be outputted. Also, there is proposed the image forming apparatus that forms the image so as to interpose the color misregistration pattern between pages in mid-course of a print job (e.g., see Japanese Unexamined Patent Application No. 2006-171352).

In addition, there is proposed the image forming apparatus that sets a width of the supporting medium larger than a maximum width of the image by having a margin, and forms the color misregistration pattern at an area outside the maximum image width (e.g., see Japanese Unexamined Patent Application No. 2005-99716).

However, when the pattern is formed before starting the print job, start of the print job is delayed. When the pattern is formed after the print job is ended, start of the next print job is delayed. When the pattern is formed between pages in mid-course of the print job, an interval between pages must be increased, thereby delaying the print speed. Further, in an apparatus using an intermediate transfer medium as the supporting medium, the pattern is not completely cleaned and is remained, thus causing a backside of the subsequent recording sheet to be stained. In the apparatus that forms the pattern in the area outside the maximum image width, decrease of the print speed or the delay of the start of the print job does not occur, compared to the aforementioned apparatus. However, the width of the supporting medium must be set sufficiently larger than the maximum image width, and accordingly, the width of each part of an image forming section must be set larger than the maximum image width. Therefore, the apparatus is inevitably upsized. Also, along with a larger width, there is a possibility of inviting an increase of cost.

Each method has both merit and demerit. A method having both of them is further desired.

SUMMARY OF THE INVENTION

In view of the above-described circumstances, the present invention is provided, and an object of the present invention is to provide a method capable of realizing a correction using the aforementioned pattern, without upsizing an apparatus and without wasting a surplus time in forming the pattern.

The present invention provides an image forming apparatus including: an output image forming section for forming an image and a pattern on a supporting medium under a prescribed condition; an output section for transferring the formed image on a recording sheet; a correction section for performing reading of the formed pattern and correcting the condition based on a result of the reading; and a correction control section for controlling operations of the output image forming section, the output section, and the correction section, wherein the correction control section identifies whether or not an area where the image is to be formed and an area where the pattern is to be formed overlap each other, and when the areas are identified that they do not overlap each other, the correction control section controls the output image forming section to simultaneously form the image and the pattern in parallel on the supporting medium.

According to an embodiment of the present invention as will be described later, the output image forming section corresponds to a mechanical section regarding an image formation, including a photoconductor drum for forming the image of each color component by using an electrophotographic process and an intermediate transfer belt for superposing an image of each color component.

According to an embodiment as will be described later, the output section corresponds to a mechanical section regarding an image output, including a section that feeds a sheet for outputting the image formed on the intermediate transfer belt, a section that transfers the formed image on the sheet, and a fusing device that fixes the image onto the sheet.

The correction section detects a position of a pattern of each color component and processes a detection signal, so as to be reflected on an operation of the output image forming section. In the embodiment as will be described later, hardware and software regarding the correction, such as a CCD image sensor that reads the position of the pattern, correspond to the correction section.

The correction control section controls an execution procedure of correction. In the embodiment as will be described later, the correction control section is realized by executing the software by a computer.

The correction control section according to the present invention controls the execution procedure of correction, so as to form the image to be outputted and the pattern for correction in parallel. In the embodiment as will be described later, the image and the pattern are simultaneously formed in a moving direction of the supporting medium.

BRIEF DESCRIPTION OF THE DRAWINGS

FIGS. 5A and 5B are explanatory views showing an example of a data form of a print queue for searching an object image by a control section of the image forming apparatus according to the present invention;

FIG. 8 is a flowchart showing a procedure of moving a print job forward, when the print job capable of simultaneously forming the pattern of the present invention is added.

DETAILED DESCRIPTION OF THE INVENTION

Figure 1:
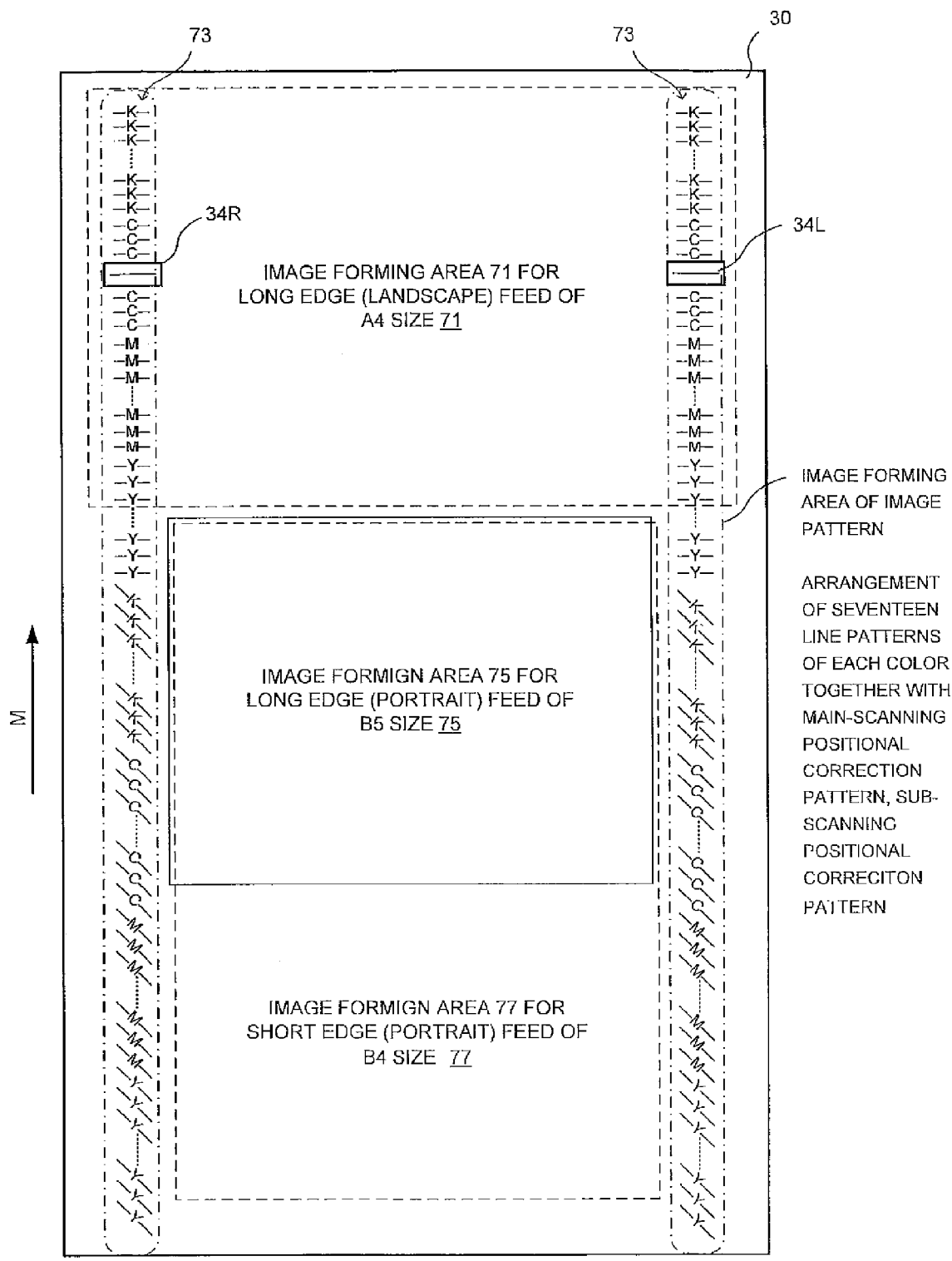
FIG. 1 is an explanatory view showing an example of a pattern formed on an intermediate transfer belt in an image forming apparatus according to the present invention.

In the image forming apparatus of the present invention, the correction control section judges whether or not an area in which the image is to be formed, and an area in which the pattern is to be formed overlap each other, and when they do not overlap each other, forms the image and the pattern in parallel on the supporting medium. Therefore, according to a judgment result, the pattern can be simultaneously formed with the image to be outputted in parallel, and the correction of the image quality can be performed. In addition, it is not necessary to upsize the apparatus.

In addition, when the pattern for correcting the image quality is formed separately from the image, unevenness occurs in some cases in density in a width direction of the image formed just after forming the pattern. Here, the pattern is assumed to be formed in a part of the area in the width direction (hereafter this area referred to as a pattern area). In a developing unit that develops the pattern and the image by toner, when supply of the toner cannot respond to a part corresponding to the pattern area, the aforementioned unevenness in density occurs. According to the present invention, the pattern is developed simultaneously with the image to be outputted in parallel, and therefore unevenness of image density under an influence of the pattern does not occur.

Here, the pattern for correcting the color misregistration is given as an example of the pattern. However, the pattern is not limited thereto, and for example, may be the pattern for correcting the density of each color component, or may be the pattern aimed at other correction.

The supporting medium may be the one formed with the image to be outputted and the pattern on its surface, and its quality of material and shape are not limited. In a color image forming apparatus of an electrophotographic system using the intermediate transfer medium, for example, the intermediate transfer medium corresponds to the supporting medium. In the image forming apparatus of the electrophotographic system not using the intermediate transfer medium and superposing the image of each color component directly on the recording sheet, for example, a supporting body that supports the recording sheet corresponds to the supporting medium. In the image forming apparatus of the electrophotographic system that superposes the image of each color component on a photoconductor, for example, the photoconductor corresponds to the supporting medium.

In addition, the image to be outputted refers to the image in a stand-by state scheduled to be outputted. For example, when a specified opportunity arrives during output of a print job consisting of a plurality of pages, a page in which image formation is not started at this time point, corresponds to the image to be outputted. Also, when the print job subjected to a print request is placed once to a queue in a standby state for processing and then the image is sequentially printed in first-in, first-out manner, the print job placed in the queue and set in a standby state for processing is included in the image to be outputted.

Preferred aspects of the present invention will be explained hereinafter.

The output image forming section may form images which respectively correspond to a plurality of color components and superpose the colored images in a prescribed positional relationship, so that the images to be transferred are formed on the supporting medium; and the correction section may read patterns which respectively correspond to the color components, detect positions of the colored patterns, and correct positions where the colored images are to be formed, based on a deviation amount between the detected positions of the colored patterns and previously defined reference positions. With this configuration, the present invention can be applied to a control of a positional deviation (color misregistration) of the image of each color component.

Further, the correction control section may control the output image forming section to form the pattern before or behind the image, when the area where the image is to be formed and the area where the pattern is to be formed overlap each other. Explanation has been given to a case that the area where the image is to be formed and the area where the pattern is to be formed do not overlap each other. However, when the area where the image is to be formed and the area where the pattern is to be formed overlap each other, an overlap of the image and the pattern can be prevented by doing so.

Further, the supporting medium may be to have the image formed on its surface while moving in one direction; the output image forming section may form the pattern at one end part or both end parts of a width direction which is orthogonal to the moving direction of the supporting medium, and form the image to be outputted, by aligning a central part of the image with a central part of the width direction; and the correction control section may identify whether or not an area of the width direction where the image to be outputted is to be formed and an area of the width direction where the pattern is to be formed overlap each other. With this configuration, the output image forming section can form the image to be outputted in a central part in the width direction and can form the image and the pattern on the supporting medium in parallel by forming the pattern in one end portion or opposite end portions in the width direction.

Still further, the correction control section may control the output image forming section to form the pattern in an area different from the area where the image is to be formed in the moving direction of the supporting medium, when the area where the image to be outputted is to be formed and the area where the pattern is to be formed overlap each other. With this configuration, when the correction control section judges that the area where the image is to be formed and the area where the pattern is to be formed overlap each other in the width direction, an overlap of the image and the pattern can be prevented by forming the pattern in a separate area.

The correction control section may identify whether or not a pattern can be formed simultaneously with an image in parallel each time an intermittent prescribed opportunity arrives, wherein the prescribed opportunity may arrive when a previously defined time limit elapses or the previously defined number of pages of the image is outputted, after the condition is corrected by the correction section. With this configuration, the correction control section can form the next pattern for correction at an interval exceeding a previously defined period or the number of pages.

Also, the correction control section may wait for an image which can be formed simultaneously with a pattern in parallel, during a time period in which a previously defined time limit elapses or the previously defined number of pages of the image is outputted after each prescribed opportunity arrives, and control the output image forming section to form the pattern before forming a next image, when the image which can be formed simultaneously with the pattern in parallel is not formed during the above time period. With this configuration, when a specified opportunity arrives, the image capable of simultaneously forming the pattern in parallel in the aforementioned period is searched. Therefore, there is a high possibility of finding an object image, compared to a case of searching the image only when the specified opportunity arrives.

Alternatively, the image forming apparatus may further include: an acquisition section for acquiring print job(s), each of the print jobs being comprised of one or more pages of image(s) to be outputted; and a print queue where each of the acquired print jobs is queued by the correction control section during a time period between the acquisition of the print job and the formation of the image(s) of the print job, wherein the correction control section may identify whether or not the print job capable of simultaneously forming the pattern with the image of the print job in parallel is placed in the print queue each time an intermittent prescribed opportunity arrives. With this configuration, when the print job capable of simultaneously forming the pattern with the image in parallel is placed in the print queue, the pattern can be formed at the time of executing the print job.

Further, when the correction control section identifies the print job capable of simultaneously forming the pattern with the image in parallel is not placed in the print queue, the correction control section may wait for a newly acquired print job capable of simultaneously forming the pattern with the image of the print job in parallel is acquired during a certain time period in which a previously defined time limit elapses after the above opportunity arrives or the number of pages of the image exceeds the previously defined number of pages of the image after the above opportunity arrives. With this configuration, during the aforementioned period, the print job capable of simultaneously forming the pattern with the image in parallel is continued to be searched. Therefore, there is a high possibility of finding the object image, compared to a case that the print job is searched only when the specified opportunity arrives.

Also, the correction control section may control to place the newly acquired print job in the print queue prior to other print job(s). With this configuration, after the specified opportunity arrives, the pattern can be further quickly formed and correction can be performed.

Alternatively, the correction control section may control to place the newly acquired print job in the print queue prior to the other print job(s), only when the pattern can not be formed within the above time period as long as the newly acquired print job is placed in the print queue in first-in, first-out order. With this configuration, when the print job capable of simultaneously forming the pattern with the image in parallel is found just before the end of the aforementioned period, the pattern can be formed in this period by placing the newly acquired print job in the print queue prior to the other print job(s).

Each of the various preferable embodiments indicated here can be combined.

The present invention will be further described below with reference to the drawings. It should be understood that the following description is illustrative of the invention in all aspects, but not limitative of the invention.

(Overall Functional Configuration of Image Forming Apparatus)

Figure 2:
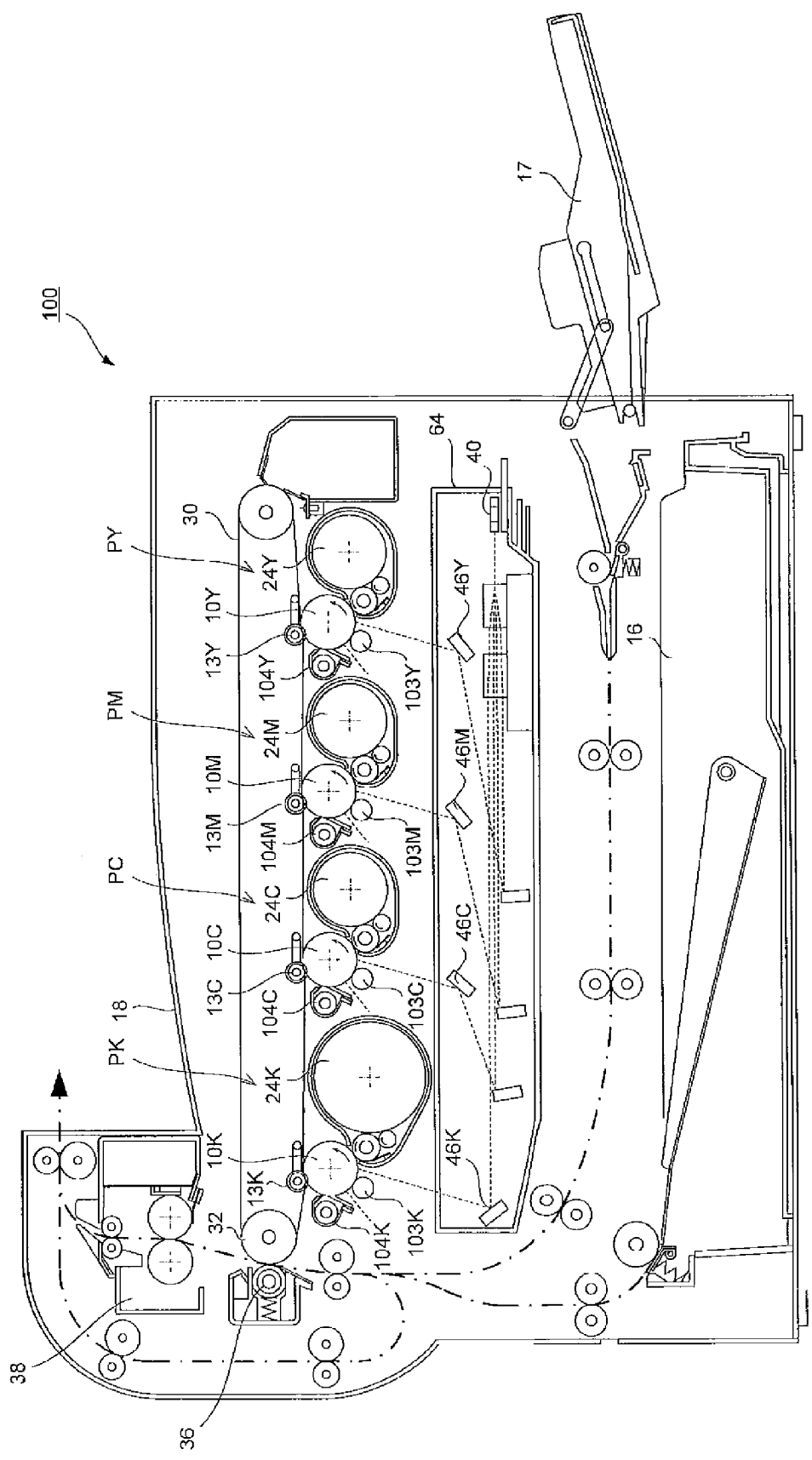
FIG. 2 is an explanatory view showing the configuration of the image forming apparatus according to the embodiment of the present invention.

Firstly, an example of a functional configuration of an image forming apparatus according to the present invention will be explained. Particularly, specific configurations of the output image forming section and the output section will be explained. FIG. 2 is an explanatory view showing a configuration of an image forming apparatus according to an embodiment of the present invention. An image forming apparatus 100 is an electrophotographic color image forming apparatus that forms a multi-color image on a recording sheet such as a paper according to image data externally transferred. Further the image forming apparatus 100 may form a mono-color image on a recording sheet. The image forming apparatus 100 includes an exposure unit 64, photoconductor drums 10 (10Y, 10M, 10C, 10K), developing units 24 (24Y, 24M, 24C, 24K), charging rollers 103 (103Y, 103M, 103C, 103K), cleaning units 104 (104Y, 104M, 104C, 104K), an intermediate transfer belt 30, intermediate transfer rollers (hereinafter simply referred to as a transfer roller) 13 (13Y, 13M, 13C, 13K), a secondary transfer roller 36, a fusing device 38, a sheet feeding cassette 16, a manual sheet feeding tray 17, and a sheet exit tray 18.

The exposure unit 64, the photoconductor drum 10, the developing unit 24, the charging roller 103, the cleaning unit 104, the intermediate transfer belt 30, the intermediate transfer roller 13 compose an output image forming section of the present invention.

The secondary transfer roller 36, the fusing device 38, the sheet feeding cassette 16, the manual sheet feeding tray 17, and the sheet exit tray 18 compose an output section of the present invention.

The image forming apparatus 100 performs image formation by using image data corresponding to each color component of four colors added with black (K) to cyan (C), magenta (M), and yellow (Y) of three primary colors of a subtractive color mixture of a color image. Four photoconductor drums 10 (10Y, 10M, 10C, 10K), four developing units 24 (24Y, 24M, 24C, 24K), four charging rollers 103 (103Y, 103M, 103C, 103K), four transfer rollers (13Y, 13M, 13C, 13K), and four cleaning units 104 (104Y, 104M, 104C, 104K) are provided so as to correspond to each color component, and they constitute four image forming sections PK, PC, PM, and PY. The image forming sections PK, PC, PM, and PY are arranged in a line in a moving direction (sub-scanning direction) of the intermediate transfer belt 30. The alphabets Y, M, C, and K appended at the end of each numeral for each part correspond to each color component. Specifically, Y corresponds to yellow, M corresponds to magenta, C corresponds to cyan, and K corresponds to black, respectively. The explanation using the numerals in which the alphabets at the end are omitted can be applied to all color components.

The charging roller 103 is a contact-type charger for uniformly charging a surface of the photoconductor drum 10 to a prescribed potential. Instead of the charging roller 103, the contact-type charger using a charging brush or a contact-type charger using a corona charger can be used. The exposure unit (sometimes referred to as an LSU or a laser scanning unit) 64 includes laser diodes not shown in FIG. 2, a polygon mirror 40, and reflection mirrors 46 (46Y, 46M, 46C, 46K). The laser diodes are provided corresponding to each color component, and laser beams modulated by the image data of each color component of black, cyan, magenta, and yellow are emitted from each laser diode. Each of the laser beams irradiates the surface of the photoconductor drum 10 uniformly charged by the charging roller 103. Accordingly, an electrostatic latent image according to the image data of each color component is formed on the surface of the photoconductor drum 10. Specifically, the electrostatic latent image corresponding to each image data of yellow, magenta, cyan, and black is respectively formed on the photoconductor drums 10Y, 10M, 10C, and 10K.

The developing unit 24 develops the electrostatic latent image formed on each photoconductor drum 10 by the toner corresponding to each color component. As a result, a visualized image (toner image) of each color component is formed on the surface of each photoconductor drum 10. When the monochromatic image is formed, the electrostatic latent image is formed only on the photoconductor drum 10K, and only the toner image of black is formed. When a color image is formed, the electrostatic latent image is respectively formed on the photoconductor drums 10Y, 10M, 10C, and 10K, and the toner images of yellow, magenta, cyan, and black are formed. The intermediate transfer roller 13 transfers each toner image on the intermediate transfer belt 30 by the action of a transfer voltage applied thereto. The intermediate transfer belt 30 moves to the intermediate transfer roller 13K from the intermediate transfer roller 13Y. When the color image is formed, each toner image is superposed on the intermediate transfer belt 30 in an order of yellow, magenta, cyan, and black with the movement of the intermediate transfer belt 30. The superposed toner image passes through a part where the secondary transfer roller 36 is disposed. At this time, in synchronization with timing when the toner image passes through, the recording sheet is fed from the sheet feeding cassette 16 or the manual sheet feeding tray 17. The fed recording sheet is transferred between the intermediate transfer belt 30 and the secondary transfer roller 36, and comes in contact with the toner image. The secondary transfer roller 36 transfers the toner image on the recording sheet by the action of the secondary transfer voltage applied thereto. The recording sheet, on which the toner image is transferred, is discharged onto the sheet exit tray 18 through the fusing device 38. The fusing device 38 fuses the toner image and fixes it onto the recording sheet when the recording sheet passes therethrough.

(Configuration of Essential Part of Image Forming Apparatus)

Next, the configuration of an essential part of the image forming apparatus will be explained. Also, a hardware configuration of the correction section and the correction control section will be explained.

Figure 3:
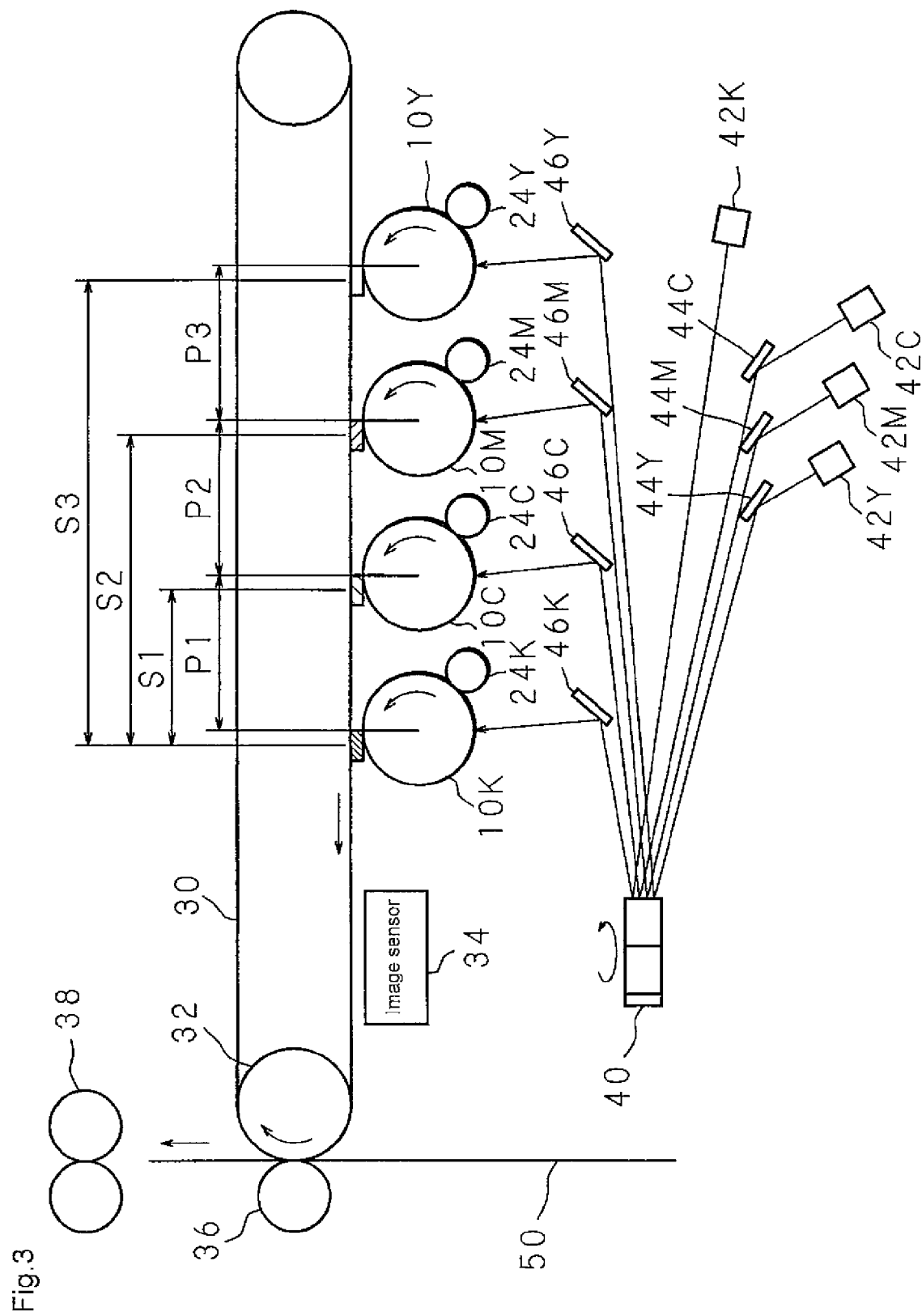
FIG. 3 is an explanatory view schematically showing a functional configuration of an essential part of the image forming apparatus according to the present invention.

FIG. 3 is an explanatory view schematically showing a functional configuration of an essential part of the image forming apparatus of the present invention. The intermediate transfer belt 30 in an endless state is driven by a belt drive roller 32 rotating in the clockwise direction toward a sheet surface in the figure. A CCD (Charge Coupled Device) image sensor 34 is disposed below the intermediate transfer 30 so as to face its surface. The CCD image sensor 34 is disposed at the downstream side of the photoconductor drum 10K along the moving direction of the intermediate belt 30, that is, between the photoconductor drum 10K and the secondary transfer roller 36.

In addition, the secondary transfer roller 36 is disposed so as to face the belt drive roller 32, with the intermediate transfer belt 30 sandwiched between them. The recording sheet 50 fed from the sheet feeding cassette 16 or the manual sheet feeding tray 17 passes between the secondary transfer roller 36 and the intermediate transfer belt 30.

Figure 4:
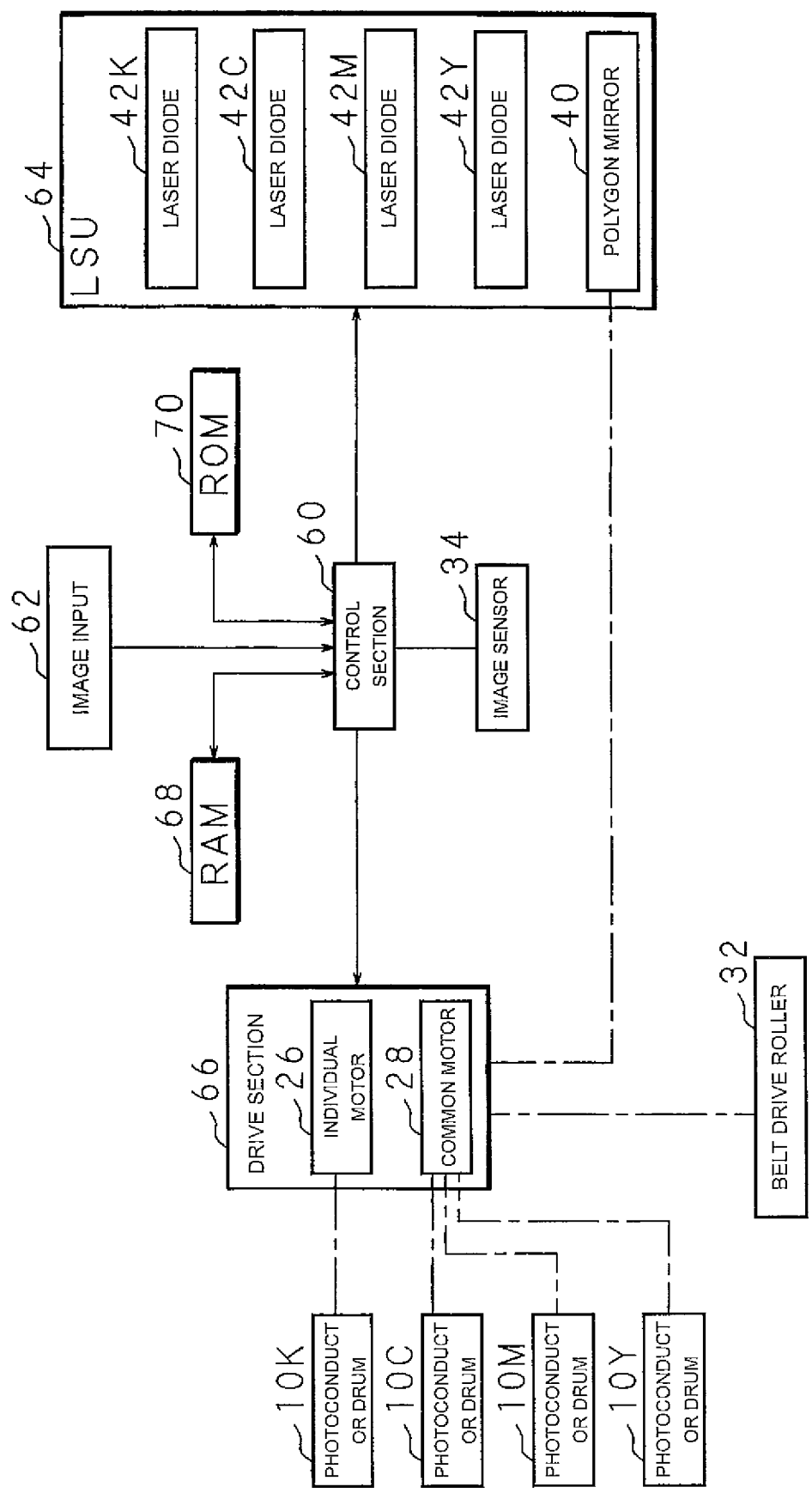
FIG. 4 is a block diagram showing an electrical configuration of the essential part of the image forming apparatus according to the present invention.

FIG. 4 is a block diagram showing an electrical configuration of the essential part of the image forming apparatus of the present invention. As shown in FIG. 4, the image forming apparatus 100 includes the CCD image sensor 34 serving as an input section and an image input section 62. Also, the LSU 64 as a control object and a drive section 66 are included. Further, a control section 60 that processes a signal or data from the input section and controls the control object, a RAM 68, and a ROM 70 are included. Further, the image forming apparatus 100 includes photoconductor drums 10K, 10C, 10M, and 10Y as driving loads, the belt drive roller 32 and the polygon mirror 40.

The CCD image sensor 34 corresponds to the correction section of this invention, in association with a function realized by the control section 60. In addition, the control section 60, the RAM 68, and the ROM 70 correspond to the correction control section of this invention.

The image input section 62 corresponds to an acquisition section of this invention. Also, the control section 60 prepares a print queue of this invention on the RAM 68.

The CCD image sensor 34 is a sensor for reading the pattern formed on the intermediate belt 30. The image input section 62 acquires from outside the image data of the image to be outputted. The source that provides the image data is a device connected to the image forming apparatus 100 via a communication line. One example of the device is a host of a personal computer. Another example of the device is an image scanner. The acquired image data is stored in the RAM 68 for printing process.

The control section 60 is specifically a CPU or a microcomputer. The RAM 68 provides a work area for the control section to work and an area as an image memory to store the image data. Information showing its attribute is added to the image data acquired from the image input section 62. The added attribute includes a vertical and horizontal size of each image and the kind of the monochromatic image and the color image. The control section 60 stores the acquired image data in the RAM 68 so as to correspond to the added attribute. The image data is stored in the RAM 68 by every job, and further is stored by every page when one job is composed of a plurality of pages. When the image data is inputted from an outside host and is formatted by a page description language, the control section 60 develops the inputted image data and stores it in the image memory.

The ROM 70 stores a program that defines a processing procedure executed by the control section 60. Further, the ROM 70 stores pattern data for producing the aforementioned pattern. The control section 60 controls a drive of the driving load shown in the figure. Further, the control section 60 controls the operation of each part of a constituent section of the image forming apparatus 100 not shown in FIG. 4.

The LSU 64 receives the signal based on the image data stored in an image memory area in the RAM 68 through an image processing section not shown. The image processing section processes the image data and provides to the LSU 64 a modulation signal according to each pixel of the image to be outputted. Note that the modulation signal is provided for each color component of yellow, magenta, cyan, and black. The modulation signal of yellow is used for modulating light emission of a laser diode 42Y disposed in the LSU 64. Each modulation signal of magenta, cyan, and black is used for modulating the light emission of the laser diode 42M, 42C, 42K in the LSU 64.

The drive section 66 includes an individual motor 26 and a common motor 28. The individual motor 26 is a motor for driving the photoconductor drum 10K. The common motor 28 drives each photoconductor drum as a common driving source for the photoconductor drums 10C, 10M, 10Y. Further, the drive section 66 includes a motor (not shown) for driving the belt drive roller 32 and a motor (not shown) for driving the polygon mirror 40. Note that the control section 60 controls the motor for driving loads of a surface of the photoconductor drum 10 and the intermediate transfer belt 30, so that peripheral surfaces thereof are moved at an equal constant speed.

The image data inputted from the image input section 62 needs to be held in the image memory area until its image is formed. The formation of the image requires time compared to acquisition of the image data. In addition, the image is not always formed in an order of acquisition of the image data. For example, a user may sometimes specify printing in a reverse order of pages. Alternatively, by specifying an editing function and double-side printing by a user, an order of pages to perform image formation needs to be changed to an input order in some cases. In order to respond to such needs, the control section 60 manages each image data stored in the image memory area by using queue. That is, in order to manage the image data stored in the image memory area by every print job, the print queue is used. Further, in order to manage a processing order of each page in each print job, the print queue and another queue are prepared and such print queue and another queue may be used. Thus, each page to form the image can be managed by the queue of a hierarchical structure of the print job and the pages.

The queue is a kind of a publicly-known data structure in a field of data processing. By this queue, link information to data to be managed is stored in a buffer of a FIFO (first-in, first-out) structure and can be referenced as needed. The data, being the management object, is linked to the ending of the buffer and set in a standby state for processing, and processing is performed sequentially from the data of the head of the buffer. When the processing is ended, the data in the buffer is moved forward. The order of the data linked to the buffer can also be replaced with one another.

The control section 60 prepares the print queue in the RAM 68. Then, the print job that is set in the standby state is linked to the print queue. Then, as long as there is the print job linked to the head of the print queue, the image of the print job of the head is formed.

(Formation of Pattern, Reading and Procedure of Correction)

Explanation will be given to a formation of the pattern executed in the image forming apparatus, its reading, and a procedure of correction based on a reading result. In a correction procedure as will be described below, the processing is executed by the correction section and the correction control section cooperatively.

When the pattern is formed, the control section 60 acquires pattern data of the pattern previously stored in the ROM 70. The acquired pattern data is developed in the image memory area and the pattern is prepared. The color component for preparing the pattern is judged and selected by the control section. Thereafter, the data of the developed pattern is transferred to the LSU 64. The laser diode of the color component that receives the data forms the electrostatic latent image of the pattern on the photoconductor drum 10. The developing unit 24 develops the formed electrostatic latent image and forms the toner image of the pattern. The toner image of each color component is transferred on the intermediate transfer belt 30.

The CCD image sensor 34 reads the formed pattern of each color component. The control section 60 performs correction of the image quality, based on the information obtained from the read pattern of each color component. For example, in a case of the color misregistration, the control section 60 obtains a misregistration amount with respect to a reference position of the pattern of each color component read by the CCD image sensor 34. Here, under the control of the control section 60, a specific color component is set as a reference color and a position of the pattern of the reference color may be set as the reference position. Alternatively, the pattern of the reference color formed on the intermediate transfer belt 30 may be set as the reference position separately from the pattern.

Under the control of the control section 60, when the pattern is formed, the laser diode 42 of each color component emits light simultaneously and the surface of each photoconductor drum 10 is simultaneously exposed to light. Thus, as shown in FIG. 3, each pattern of black, cyan, magenta, and yellow is transferred to the intermediate transfer belt 30 at an identical timing. In this case, an interval between each pattern transferred on the intermediate transfer belt 30 and an interval between each photoconductor drum 10 become equal to each other. As shown in FIG. 3, the interval between the photoconductor drum 10K and 10C is P1. The interval between photoconductor drum 10C and 10M is P2. In addition, the interval between the photoconductor drum 10M and 10Y is P3.

Here, a procedure of obtaining the pattern of each color component by the control section 60 will be described in detail. FIG. 1 is an explanatory view showing an example of the pattern formed on the intermediate transfer belt 30. FIG. 1 is a view of the intermediate transfer belt 30 viewed from a lower side, and the intermediate transfer belt 30 moves to an upper part (in a direction of an arrow M) from a lower part of FIG. 1. CCD image sensors 34F and 34R are linear censors, and each cell of the CCD image censors 34F and 34R is disposed along the width direction orthogonal to the moving direction of the intermediate transfer belt 30. In addition, two CCD image censors 34F and 34R are arranged on a straight line extending in the width direction, and are disposed on both end parts of the intermediate transfer belt 30. As shown in FIG. 1, the pattern is formed on the both end parts of the intermediate transfer belt 30. The pattern of one end side of each color component is composed of a set of seventeen line patterns arranged in the moving direction of the intermediate transfer belt 30. Accordingly, sum total of the line patterns on both end parts is 34. A length of seventeen patterns arranged in the moving direction is approximately equal to a peripheral length of the photoconductor drum 10. In FIG. 1, characters of K, C, M, Y are attached to show the color of each line pattern, but this is for explanation and an actual pattern is a simple line pattern not including a character pattern. The line pattern extending in parallel to the width direction out of the line patterns shown in FIG. 1, is the pattern (pattern for correction in a sub-scanning direction) for correcting an image forming position in the moving direction. The line pattern extending obliquely at an angle of 45 degrees to the width direction is the pattern (pattern for correction in a main scanning direction) for correcting the image forming position in the width direction.

By the signal from the CCD image sensor 34, the control section 60 obtains a passing timing of a tip end and a rear end of each line pattern when each line pattern passes through the CCD image sensor 34. An average value of the obtained tip end passing timing and the rear end passing timing is set as the timing when a center of each line pattern passes through. Further, the control section obtains an average of the passing timing detected regarding each cell of the image sensors. The obtained value is set as the passing timing of each line pattern. The control section 60 temporarily stores the passing timing of each line pattern obtained as described above in the RAM 68.

In addition, as shown in FIG. 1, seventeen line patterns are arranged as the pattern of each color component. The control section 60 further obtains the average of the passing timing of the seventeen line patterns respectively. An obtained average value may be the timing corresponding to the image forming position of each color component. Time corresponding to intervals S1, S2, and S3 of the pattern of each color component shown in FIG. 3 is calculated from the obtained timing and the moving speed of the intermediate transfer belt 30. The interval S1 is the interval between the pattern of the reference color (black) and the pattern of cyan. The interval S2 is the interval between the pattern of the reference color (black) and the pattern of magenta. The interval S3 is the interval between the pattern of the reference color (black) and the pattern of yellow.

Next, explanation will be given to a positional correction in the sub-scanning direction when black is defined as a reference color. The control section 60 performs correction so that the interval S1 is identical to the interval P1 (see FIG. 3) between the photoconductor drum 10K of black and the photoconductor drum 10C of cyan. That is, correction of the image forming position of a cyan image in an image formation thereafter is performed, so that a difference between the interval S1 and P1 is not more than a previously defined threshold value. The interval P1 is a previously defined value. The forming position is corrected by changing a light emission starting timing of the laser diode 42C. More specifically, the correction in the sub-scanning direction is realized by changing the light emission starting timing, in scanning line units.

Further, the control section 60 performs correction so that the interval S2 is identical to the interval (P1+P2) between the photoconductor drum 10K of black and the photoconductor drum 10M of magenta. That is, the forming position of the magenta image in the image formation thereafter is corrected, so that the difference between the interval S2 and (P1+P2) is not more than a previously defined threshold value. Similarly to P1, the interval P2 is a previously defined value. The correction of the forming position is realized by correcting the light emission starting timing of the laser diode 42M.

Further, the control section 60 performs correction, so that the interval S3 is identical to the interval (P1+P2+P3) between the photoconductor drum 10K of black and the photoconductor drum 10Y of yellow. That is, the forming position of a yellow image in the image formation thereafter is corrected, so that the difference between the interval S3 and (P1+P2+P3) is not more than the threshold value. Similarly to P1 and P2, the interval P3 is a previously defined value. The correction of the forming position is realized by correcting the light emission timing of the laser diode 42Y.

Subsequently, the positional correction in the main-scanning direction will be explained. The positional correction in the main-scanning direction is performed after a correction amount in the sub-scanning direction is obtained. Regarding the pattern for correction in the main-scanning direction, the control section 60 obtains the interval between the pattern of the reference color (black) and the pattern of other each color. The interval between the pattern of the reference color (black) and the pattern of cyan is represented by S1'. In addition, the interval between the pattern of the reference color (black) and the pattern of magenta is represented by S2'. Further, the interval between the pattern of the reference color (black) and the pattern of yellow is represented by S3'. The obtained interval is corrected by the difference between the previously obtained intervals S1, S2, and S3 in the sub-scanning direction and the reference color. That is, when the corrected interval is represented by S1", S2", and 53", $$S1''=S1'-(S1-P1)$$

$$S2''=S2'-\{S2-(P1+P2)\}$$

$$S3''=S3'-\{S3-(P1+P2+P3)\}$$

The control section 60 corrects the interval S1" so as to identical to the interval P1. Specifically, the correction of the forming position of a cyan image in the image formation thereafter is performed, so that the difference between the interval S1" and P1 is not more than a previously defined threshold value. The correction in the main and sub-scanning directions is realized by changing the light emission starting timing of the laser diode 42C of each scanning line. In addition, the control section 60 corrects the interval S2" so as to identical to the interval (P1+P2). That is, the correction of the forming position of a magenta image in the image formation thereafter is performed, so that the difference between the interval S2" and (P1+P2) is not more than a previously defined threshold value. Further, the control section 60 corrects the interval S3" so as to identical to the interval (P1+P2+P3). That is, the correction of the forming position of a yellow image in the image formation thereafter is performed so that the difference between the interval S3" and (P1+P2+P3) is not more than a previously defined threshold value.

Note that the control section 60 may also correct a transfer rate of the modulation signal in the main scanning direction, so that the intervals S1", S2", S3" obtained by reading the pattern for correction in the main-scanning direction are identical between the CCD image sensors 34F and 34R. This is the correction for suppressing a variation of an image magnification of each color component in the main scanning direction.

(Output Image and Simultaneous Formation of Pattern)

Subsequently, explanation will be given to an output image and a simultaneous formation of the pattern, which are particularly characteristic parts of this invention. The control of the simultaneous formation is realized by the correction control section of the present invention.

FIG. 1 shows an area of the image to be formed on the intermediate transfer belt 30, when the recording sheet of A4 size is transversely fed. This area is a laterally long rectangular area 71 surrounded by a chain line. This area is overlapped on an area 73 forming the pattern in the width direction. Right and left end parts of the intermediate transfer belt 30 is the area forming the pattern, corresponding to the area of vertically long two rows surrounded by one-dot chain line. However, when the recording sheet of B5 size is transversely fed, an area 75 forming its image is not overlapped on the area forming the pattern. The area 75 forming the image of the recording sheet of B5 size is a laterally long rectangular area surrounded by a solid line. Even when the recording sheet of B4 size is longitudinally fed, similarly the overlapping does not occur. Accordingly, when the print job is smaller than a width for transversely feeding B5, the pattern for correction can be formed on both end parts of the image. When a dimension of the essential part of the image forming apparatus and an arrangement of each constituent element are determined, a sheet size (hereinafter this size referred to as a small size) capable of simultaneously forming the pattern is known. When the pattern is formed, the control section 60 judges whether or not there is the image scheduled to be outputted at this time, that is, whether or not there is the print job of a small size in the print job linked to the print queue. FIG. 5 is an explanatory view showing an example of a data form of a print queue whereby the control section 60 searches the object image. As shown in FIG. 5A, the print queue stores reference information (reference address) referenced to the area where an attribute of the print job linked to the queue and the data of the print job are stored. The stored attribute includes a page size and the number of pages.

Figure 6:
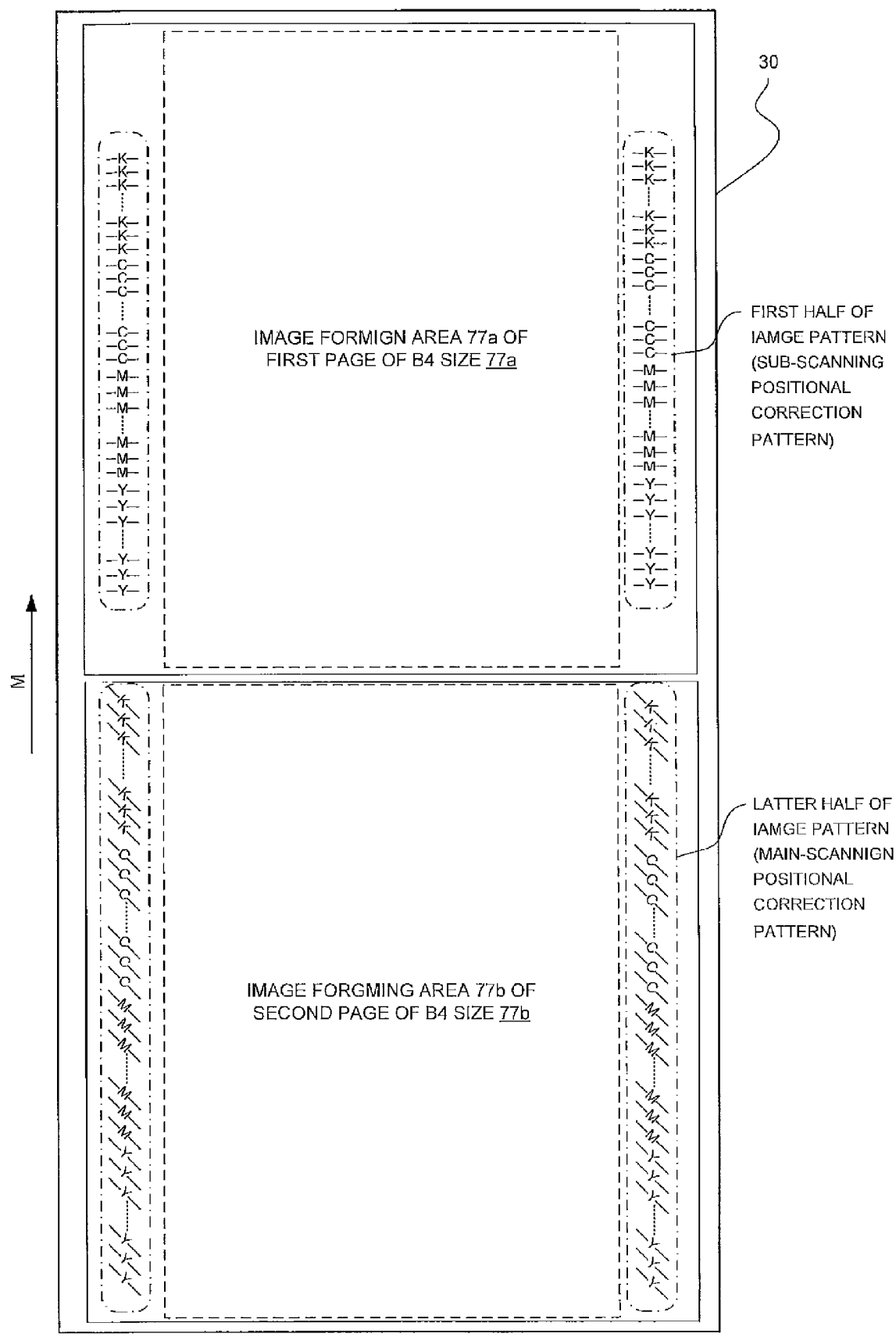
FIG. 6 is an explanatory view showing a different example of the pattern formed on the intermediate transfer belt of the image forming apparatus according to the present invention.

When the image of the print job and the pattern are simultaneously formed in parallel, under the control of the control section 60, the image of the print job stored in the image memory area is superposed on the pattern. Then, the modulation signal is generated based on the superposed data, which is then transferred to the LSU 64. Note that in order to form a series of pattern in this embodiment, it must be formed over a plurality of pages of the print job. For example, FIG. 6 is an explanatory view showing a different example of the pattern formed on the intermediate transfer belt 30 of the image forming apparatus according to the present invention. As shown in FIG. 6, the pattern is formed extending over areas 77a and 77b of two pages of B4 size on both sides thereof. Accordingly, the control section 60 judges whether or not prescribed pages or more are continued, so that the pattern can be simultaneously formed. The number of pages capable of simultaneously forming the pattern in parallel is a specified value with respect to the page size because it is determined by the interval between each page and the pattern. As shown in FIG. 6, regarding the image of B4 size, if two or more pages are continued, the pattern can be simultaneously formed.

Figure 7:
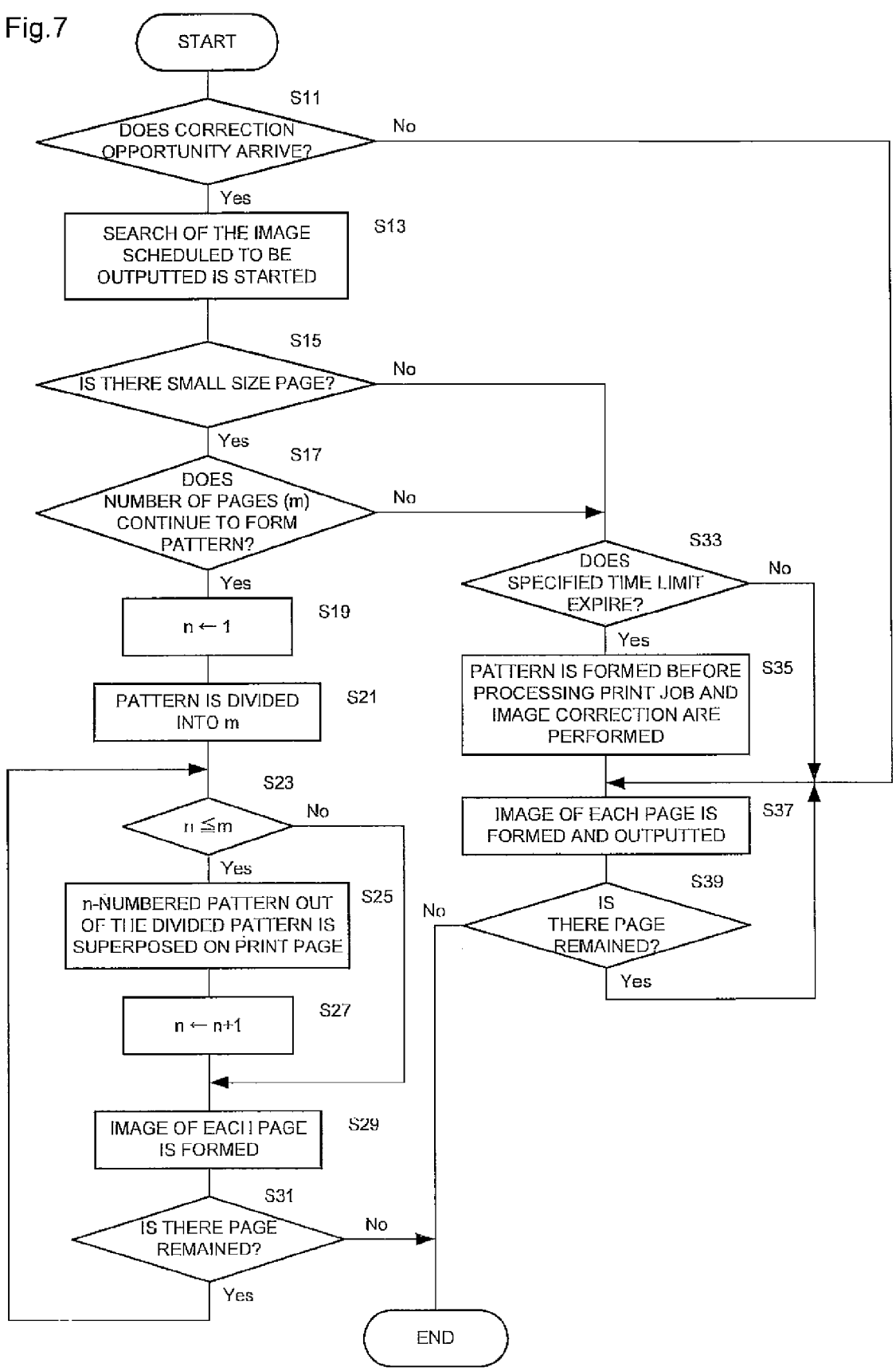
FIG. 7 is a flowchart showing a processing order for determining whether or not the pattern of the present invention is simultaneously formed.

FIG. 7 is a flowchart showing a processing procedure that the control section 60 judges whether or not the pattern is simultaneously formed. The control section 60 executes the processing of FIG. 7 every time the processing of one print job is started. In FIG. 7, first, the control section 60 judges whether or not the specified opportunity of image correction arrives (step S11). Here, the specified opportunity of the image correction is judged to arrive when a prescribed time is elapsed from the previous correction. Alternatively, it may be judged to arrive when prescribed number of pages is outputted from the previous correction. Alternatively, it may be judged to arrive by combining them, or may be judged to arrive when a component closely related to the image such as a photoconductor drum 10 is replaced. When the correction timing is judged not to arrive, the control section 60 sequentially forms and outputs the image of each page of the print job without forming the pattern (step S37, S39).

When the control section so judges that the correction opportunity arrives, the control section 60 starts to search whether or not there is a small size page in the print job scheduled to be outputted (step S13). For this purpose, the item of the "page size" of the print queue shown in FIG. 5 is referred to. In this embodiment, the object of search is the print job linked to the print queue. The control section 60 examines the print job linked to the print queue sequentially from the head. When the small size page is not found, the small size page is searched by repeating the processing from step S1 when the processing of the next print job is started. This search is repeated for every start of processing after the correction opportunity arrives until a specified time limit expires. The prescribe time limit is, for example, the time limit from an arrival of an opportunity until a prescribed time is elapsed, or may be the time limit from the arrival of the opportunity until prescribed number of pages is outputted, or may be the time limit by combining them.

The explanation is returned to the flowchart. In step S15, when the small size page is not found, a routine is advanced to step S33, and whether or not a specified time limit expires is judged. When the time limit does not expire, the image of each page of the print job is sequentially formed and outputted, without forming the pattern (step S37, S39). When the time limit expires, under the control of the control section, the pattern is formed and the image correction is performed, before the print job is processed, namely, separately from the image of each page (step S35). Thereafter, the image of each page of the print job is sequentially formed and outputted (step S37, S39).

Meanwhile, when the small size page is found in step 15, the control section 60 judges whether or not there is the print job of continuous number of pages required for forming the pattern (step S17). For this purpose, the item of the "number of pages" of the print queue shown in FIG. 5 is referred to. Also, required number of pages m is a previously defined value for each page size. When m pages are not continuous, the routine is advanced to the aforementioned step S33. When there is the print job of continuous m pages, the pattern is printed in the step thereafter together with the image of the print job of 1 to m pages. First, the control section 60 initializes a variable n for counting number of pages (step S19). The variable n is the variable for being used for counting the number of pages from 1 to m. Next, the control section 60 divides the pattern into m patterns (step S21). The divided pattern is superposed on each page from 1 to m respectively.

Subsequently, the control section 60 judges whether or not the variable n is not more than m (step S23). At first, a condition of setting n at not more than m is satisfied. When the variable n is not more than m, n-numbered pattern out of the patterns divided in step S21 is superposed on the image of n-numbered page of the print job (step S25). Then, the variable n is added with 1 (step S27), and the image of this page is formed (step S29). Thereafter, the control section 60 judges whether or not there are remaining pages in the print job (step S31). When, there are the remaining pages, the routine is advanced to step S23 to form a loop. Here, the processing for the next page is repeated. In step S23, when the variable n exceeds m, the image of this page is formed without performing superposition of the pattern (step S29). When the image of all pages of the print job is formed, the processing gets out of the loop and is ended by the judgment of step S31.

(Change of Order of Print Queue)

Further, as a preferable aspect of the present invention, the explanation will be given to the processing of moving the print job forward when added with this print job capable of simultaneously forming the pattern.

FIG. 8 is a flowchart showing the procedure of moving the print job forward when the print job capable of simultaneously forming the pattern of the present invention is added. The processing of FIG. 8 is executed every time a new job is added to the print queue, after the opportunity of image correction arrives.

In FIG. 8, the print job of the head out of the print jobs linked to the print queue is referenced first (step S41). The page size of the referenced print job is referenced, and whether or not this print job is a job for the small size page is judged (step S43). When the print job is not the job for the small size page, the routine is advanced to step S55, and whether or not the print job presently referenced is the job for the ending of the print queue is judged (step S55). When the print job is the job not for the ending of the print queue, the next print job is referenced (step S57), and the judgment after step S43 is repeated. This loop is repeated until the small size job of a prescribed number of pages or more is found or until a reference object reaches the ending of the print job. In step S55, when it is so judged that a reference is completed up to the ending of the print queue, the processing is ended.

Meanwhile, in step S43, when the referenced print job is the small size print job, subsequently the control section 60 judges whether or not the number of pages required for forming the pattern is continued (step S45). When there is no required number of pages, the routine is advanced to the aforementioned step S55. When there is required number of pages, the control section 60 judges whether or not this job exceeds a specified time limit in a state of the present print queue (step S47). When it is so judged that the time limit does not expire, the processing is ended. That is, a registration order in the print queue is not replaced.

When the control section 60 so judges that the found small size job is not processed in a specified time limit in the present processing order as it is, an object print job is moved forward one by one in the step thereafter, so as to be positioned within a specified time limit. First, the control section 60 judges whether or not the object print job can be moved forward in the print queue. When the head of the print queue is the object print job, the print job can not be moved forward. When it is so judged that the print job can not be moved forward, the routine is advanced to step S59. When the print job can be moved forward, the control section 60 moves the object print job forward by one in the print queue (step S51). Then, when the processing is executed in this order, the control section 60 estimates whether or not the object print job can be processed in a specified time limit (step S53). For example, when the time limit is managed by the number of pages, the item of the "number of pages" in the print queue is referenced, and the control section 60 judges whether or not the total number of pages before the object print job from the head print job is positioned within a specified time limit. When the time limit is managed by time, the "page size" and the "number of pages" before the object print job from the head are referenced. Then, by using a previously defined standard processing time of each page size, the control section 60 judges whether or not the time until the start of the processing of the object print job is positioned within a specified time limit.

When the control section 60 estimates that a specified time limit expires, the routine is advanced to step S49 and the processing order of the object print job is moved forward by one. When it is so judged that the processing of the object print job can be started within the time limit, by the judgment of step S53 in the loop, the processing gets out of the loop and is ended. When the print job is moved forward up to the head, that is, when a judgment result of step S49 is No, the routine is advanced to step S59. In step S59, the control section 60 judges whether or not the object print job is processed within a specified time limit, as a result of moving the object print job forward to a maximum. Here, when it is so judged that the object print job can not be printed within a specified time limit, the control section 60 cancels moving the object print job forward and returns to the processing to the ending of the print queue (step S61). As a result, in step S35 of FIG. 7, the pattern is formed separately from the image of the print job. In the aforementioned step S59, when it is so judged that the object print job is processed in a specified time limit, the processing is ended.

When the print job moved forward by the processing of FIG. 8 is processed within the time limit, the pattern is formed together with the image of the object print job.

FIG. 5 is a view showing a condition of replacing an order of the print job, by the processing of FIG. 8. That is, FIG. 5B shows a condition that at the time point of FIG. 5A, the print job of 3 pages of B4 size added to the ending of the print queue is moved forward to the head of the print queue by the processing of FIG. 8.

Note that the object print job can also be moved forward to the head of the print queue instantly. However, as shown in FIG. 8, by moving the print job forward one by one, the number of the print jobs that receive an influence of replacement can be suppressed to a minimum. This is a consideration so that a user does not feel uncomfortable.

The present invention has various modified examples other than the above-described embodiments. Such modified examples should not be interpreted as not belonging to the scope of the present invention. The present invention should include all modifications in the same meaning and within a range of the scope of claims.

What is claimed is:

1. An image forming apparatus comprising:
an output image forming section for forming an image and a pattern on a supporting medium under a prescribed condition;
an output section for transferring the formed image on a recording sheet;
a correction section for performing reading of the formed pattern and correcting the condition based on a result of the reading; and
a correction control section for controlling operations of the output image forming section, the output section, and the correction section,
wherein the correction control section identifies whether or not an area where the image is to be formed on the supporting medium and an area where the pattern is to be formed overlap each other in a width direction each time an intermittent prescribed opportunity arrives, and when the areas are identified that they do not overlap each other, the correction control section controls the output image forming section to simultaneously form the image and the pattern in parallel on the supporting medium, wherein the prescribed opportunity arrives when a previously defined time limit elapses or the previously defined number of pages of the image is outputted, after the condition is corrected by the correction section.

2. The image forming apparatus according to claim 1, wherein
the output image forming section forms images which respectively correspond to a plurality of color components and superposes the colored images in a prescribed positional relationship, so that the images to be transferred are formed on the supporting medium; and
the correction section reads patterns which respectively correspond to the color components, detects positions of the colored patterns, and corrects positions where the colored images are to be formed, based on a deviation amount between the detected positions of the colored patterns and previously defined reference positions.

3. The image forming apparatus according to claim 1, wherein the correction control section controls the output image forming section to form the pattern before or behind the image, when the area where the image is to be formed and the area where the pattern is to be formed overlap each other.

4. The image forming apparatus according to claim 1, wherein the supporting medium is to have the image formed on its surface while moving in one direction;

the output image forming section forms the pattern at one end part or both end parts of a width direction which is orthogonal to the moving direction of the supporting medium, and forms the image to be outputted, by aligning a central part of the image with a central part of the width direction; and the correction control section identifies whether or not an area of the width direction where the image to be outputted is to be formed and an area of the width direction where the pattern is to be formed overlap each other.

5. The image forming apparatus according to claim 4, wherein the correction control section controls the output image forming section to form the pattern in an area different from the area where the image is to be formed in the moving direction of the supporting medium, when the area where the image to be outputted is to be formed and the area where the pattern is to be formed overlap each other.

6. The image forming apparatus according to claim 1, wherein the correction control section identifies whether or not a pattern can be formed simultaneously with an image in parallel each time an intermittent prescribed opportunity arrives, wherein the prescribed opportunity arrives when a previously defined time limit elapses or the previously defined number of pages of the image is outputted, after the condition is corrected by the correction section.

7. The image forming apparatus according to claim 6, wherein the correction control section waits for an image which can be formed simultaneously with a pattern in parallel, during a time period in which a previously defined time limit elapses or the previously defined number of pages of the image is outputted after each prescribed opportunity arrives, and controls the output image forming section to form the pattern before forming a next image, when the image which can be formed simultaneously with the pattern in parallel is not formed during the above time period.

8. The image forming apparatus according to claim 1, further comprising:

an acquisition section for acquiring print job(s), each of the print jobs being comprised of one or more pages of image(s) to be outputted; and a print queue where each of the acquired print jobs is queued by the correction control section during a time period between the acquisition of the print job and the formation of the image(s) of the print job, wherein the correction control section identifies whether or not the print job capable of simultaneously forming the pattern with the image of the print job in parallel is placed in the print queue each time an intermittent prescribed opportunity arrives.

9. The image forming apparatus according to claim 8, wherein when the correction control section identifies the print job capable of simultaneously forming the pattern with the image in parallel is not placed in the print queue, the correction control section waits for a newly acquired print job capable of simultaneously forming the pattern with the image of the print job in parallel is acquired during a certain time period in which a previously defined time limit elapses after the above opportunity arrives or the number of pages of the image exceeds the previously defined number of pages of the image after the above opportunity arrives.

10. The image forming apparatus according to claim 9, wherein the correction control section controls to place the newly acquired print job in the print queue prior to other print job(s).

11. The image forming apparatus according to claim 10, wherein the correction control section controls to place the newly acquired print job in the print queue prior to the other print job(s), only when the pattern can not be formed within the above time period as long as the newly acquired print job is placed in the print queue in first-in, first-out order.

* * * * *